Jan. 6, 1942.   F. L. VAN WEENEN   2,268,972
PROJECTOR
Filed Dec. 17, 1938

INVENTOR
F. L. van Weenen
BY C. F. Wenderoth
ATTORNEY

Patented Jan. 6, 1942

2,268,972

UNITED STATES PATENT OFFICE 2,268,972

PROJECTOR

Franciscus Lambertus Van Weenen, Eindhoven, Netherlands, assignor, by mesne assignments, to Hartford National Bank and Trust Company, Hartford, Conn., as trustee Application December 17, 1938, Serial No. 246,450 In Germany May 6, 1938

2 Claims. (Cl. 88—24)

My invention relates to improvements in projectors for stationary or motion pictures which comprise a light source and a reflector, for instance a mirror, for focussing the light.

Provided it is not arranged on the bulb of the projection lamp for some special reason, it is the standard practice to fixedly secure the reflector to the wall of the lamp housing or to adjustably arrange it on a support. With such latter constructions however, it is necessary to adjust the reflector subsequently in order to give it the correct position with respect to the optical axis of the illumination system.

This adjustment is rather difficult, for instance with a spherical reflector, because the center of curvature of such a reflector must coincide exactly with the center of the light source.

The object of my invention is to overcome the above difficulties and to provide a simple support with which the reflector can not be placed out of adjustment.

In accordance with the invention, I use a spherical reflector and support the same on its convex side by at least three points which are located on a circle lying in a plane normal to the optical axis of the system with its center on this axis. Thus, the spherical rear side of the reflector, and consequently also its spherical reflecting surface, will always occupy the correct position, i. e. with its center of curvature lying at the light source.

In order that the invention may be clearly understood and readily carried into effect I shall describe the same in more detail with reference to the accompanying drawing in which.

Figure 1:
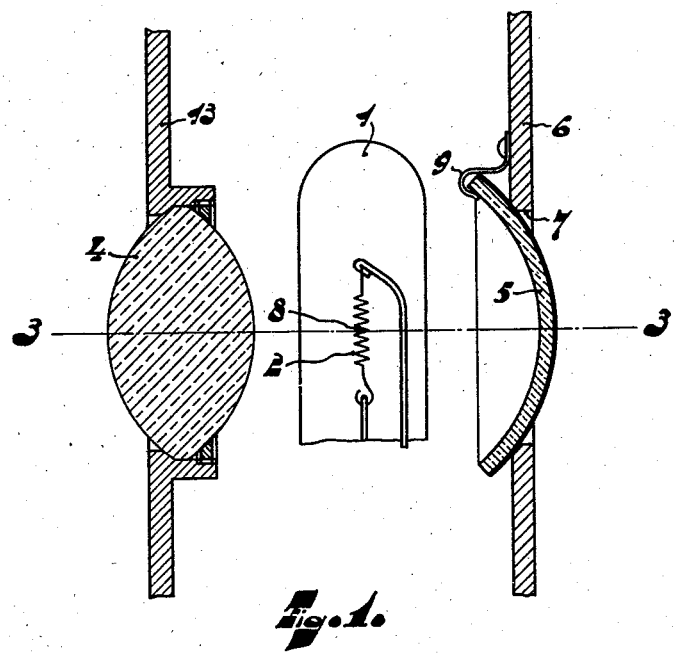
Figure 1 is a sectionized view of a portion of a projector.

As shown in the drawing, an incandescent lamp 1 has a plurality of helical filaments 2 (only one being visible) arranged symmetrically with respect to the optical axis 3—3 of the illumination system. A portion of the light emitted by lamp 1 passes directly to a condenser lens 4 suitably supported by a wall 13 of the lamp housing, and is projected thereby on to a film or a picture slide (not shown). Another portion of the light passes to a spherical mirror 5 and is reflected thereby, in a known manner, so as to pass between the helical filaments 2. For this purpose it is, however, necessary that the center 8 of the helical filaments 2 coincides with the center of curvature of mirror 5.

In accordance with the invention the rear wall 6 of the lamp housing is provided with a circular aperture 7 which lies in a plane normal to axis 3—3 and has its center on this axis. The mirror rests in aperture 7 so that its center of curvature will always lie on the optical axis 3 and at point 8. Due to the correct position of the lamp 1 in its socket (not shown) the plane of the helical filaments 2 will always be located normal to axis 3 at point 8, and therefor the mirror 5 and the light source will always be in proper alignment regardless of a slight shifting of mirror 5 in the aperture 7.

Three bend-over blade springs (only one being shown) are secured to the rear wall 6 and hold the mirror to wall 6 to prevent rattling thereof.

Although I have illustrated the reflector as being supported on a circular edge, it will be obvious to one skilled in the art that the same results are obtained if only three points of the edge are used, which points should preferably be located 120° apart.

Figures 2, 3:
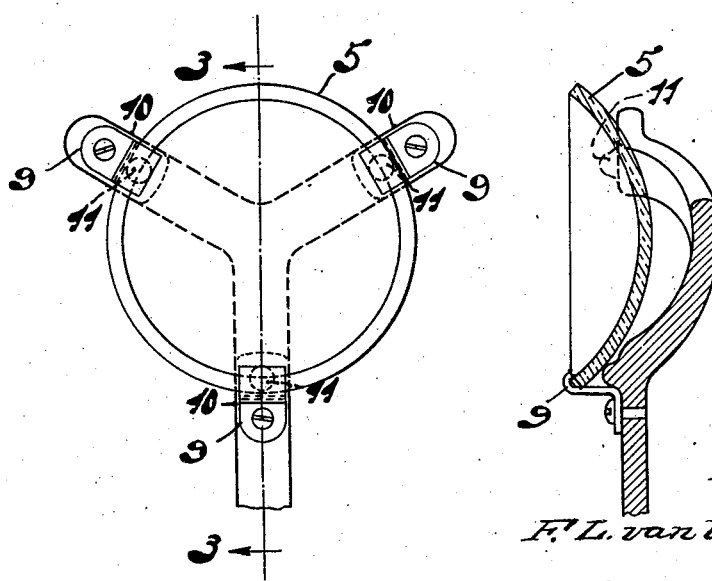
Fig. 2 is a front view of a support.
Fig. 3 is a section through line 3—3 of Figure 2.

For this purpose the mirror may be supported by the support illustrated in Figs. 2 and 3 which has three arms 10 each provided with a protuberance 11 and a threaded hole to which the clamp 9 of Figure 1 can be secured. In accordance with the invention the protuberances 11 upon which the mirror 5 rests lie in a circle within a plane normal to the optical axis of the system and with its center on this axis.

While I have described my invention in connection with specific examples and applications, I do not wish to be limited thereto because obvious modifications will appear to one skilled in this art.

What I claim is:

1. In an illuminating system of a projector a light source, a reflector having a concave spherical reflecting surface and a spherical supporting surface parallel thereto, a supporting member fixed with respect to said light source and having at least three points lying in a plane normal to the optical axis of the system and disposed at equal distances from the point of intersection of said plane and axis, said points being fixed with respect to each other and to said light source, and means pressing the supporting surface of said reflector against said points.

2. In an illuminating system of a projector a light source, a reflector having a concave spherical reflecting surface and a spherical supporting surface parallel thereto, a supporting member fixed with respect to said light source and provided with an opening having a circular supporting edge, said edge lying in a plane perpendicular to the optical axis of the system with its center on said axis and being fixed with respect to said light source, and means pressing the supporting surface of said reflector against said circular edge.

FRANCISCUS LAMBERTUS VAN WEENEN.